June 6, 1933.  C. E. WOOD  1,913,045
UNIVERSAL JOINT
Filed May 13, 1931
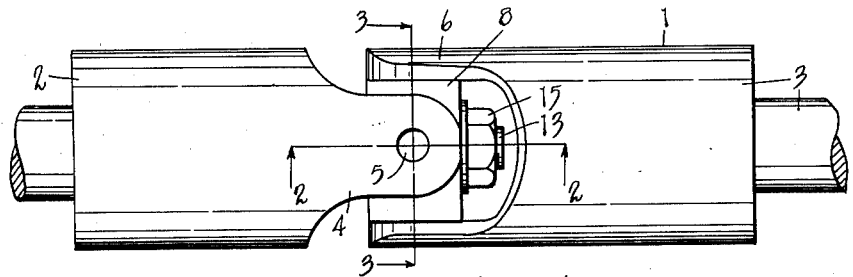
Fig. 1
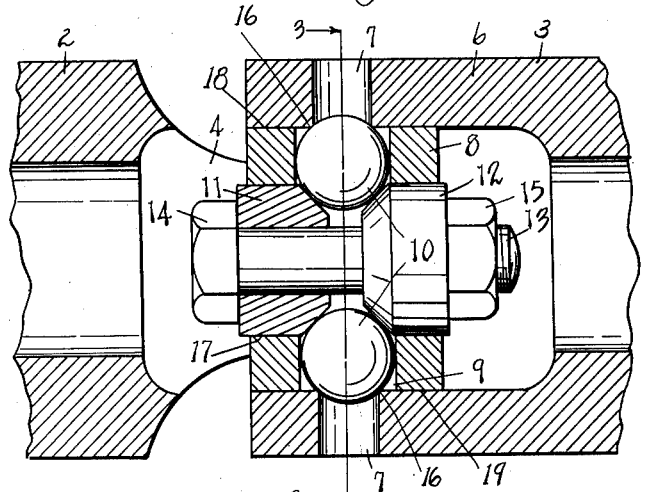
Fig. 2
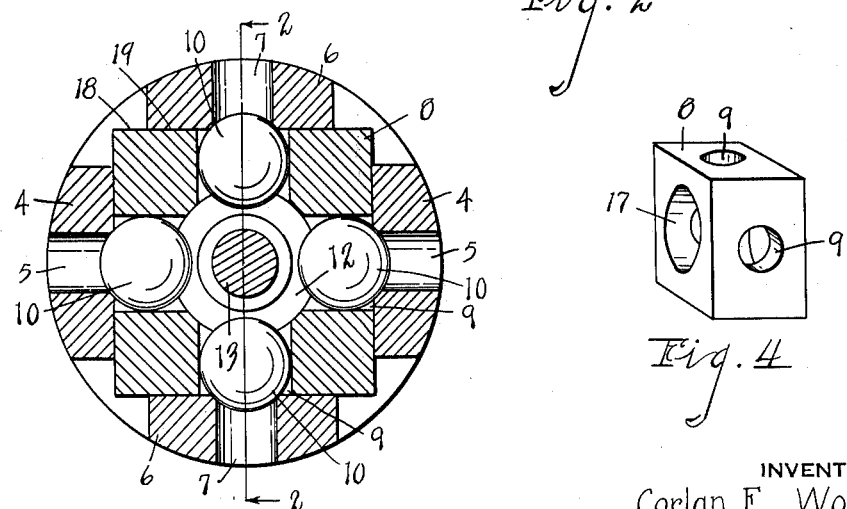
Fig. 3
Fig. 4
INVENTOR
Corlan E. Wood
BY
Chappell & Earl
ATTORNEYS Patented June 6, 1933

1,913,045

UNITED STATES PATENT OFFICE

CORLAN E. WOOD, OF ALLEGAN, MICHIGAN, ASSIGNOR TO BLOOD BROTHERS MACHINE CO., OF ALLEGAN, MICHIGAN

UNIVERSAL JOINT

Application filed May 13, 1931. Serial No. 537,108.

My invention relates to universal joints and has for an object to provide a universal joint which is relatively simple in construction and efficient in operation.

Another object of my invention is to provide a universal joint which may be readily assembled, adjusted and disassembled.

Objects relating to details of construction and operation of my invention will appear from the description to follow. The invention is pointed out in the claims.

A structure which is a preferred embodiment of my invention is illustrated in the accompanying drawing in which:

Fig. 1 is a view in side elevation of a universal joint constructed in accordance with my invention.

Fig. 2 is an enlarged longitudinal sectional view of the universal joint shown in Fig. 1 taken on line 2—2 of Fig. 3.

Fig. 3 is a cross sectional view taken on line 3—3 of Fig. 2, and

Fig. 4 is a perspective view of the journal member drawn to a different scale.

Referring to the drawing, the universal joint 1 comprises a forked shaft member 2 and is arranged for coaction with a similar forked shaft member 3.

The arms 4 of the shaft member 2 are provided with holes 5 which are preferably formed by boring through the arms 4 in a single operation. The arms 6 of the forked shaft member 3 are provided with similar holes 7. The inner ends of the holes 5 and 7 in the arms 4 and 6 form journal bearings 16.

A journal member 8 which is suitably shaped so as to fit snugly between the arms of the forked shaft members 2 and 3 is provided, having radial bore-like journal bearings 9 arranged so as to coact with the journal bearings 16 in the arms of the shaft members.

The journal member 8 is also provided with an axial bore opening 17 from which the journal bearings extend to the outside of the journal member.

Spherical journal members are disposed in the journal bearings 9 of the journal member for coaction with the bearings of the shaft members. The spherical journal members 10 are supported in their proper positions by means of conical journal supporting members 11 and 12 which are fitted into the axial opening 17 extending through the journal member 8.

The conical journal supporting members 11 and 12 are held in position by means of a bolt 13 having a head 14 and an adjusting nut 15.

It will be appreciated that the adjustment of the spherical bearing members 10 in the journal bearings 16 may be readily controlled by turning the nut 15 on the bolt 13.

While I have described and illustrated means for simultaneously adjusting the journal supporting members 11 and 12 it will be understood that one of these members may be rigidly secured in place to the journal member and the adjustment of the spherical journal members may then be taken care of by the other journal supporting member which is loosely mounted within the journal member.

From the above description, it will be apparent that I provide a universal joint which is simple in construction and comparatively efficient in operation.

While I prefer to bore holes through the arms of the forked shaft members in order to form the journal bearings 16, it will be understood that these bearings may be made by merely forming recesses on the inside of the arms of the forked shaft members. I prefer to form them by boring holes through the arms because this is much simpler, cheaper, and results in a superior universal joint for the reason that the alignment of the journal members is assured.

The journal member 8 transmits turning forces from one of the shaft members to the other through its outer surfaces 18 and the inner surfaces 19 of the arms of the forked shaft members.

Having thus described my invention, what I claim as new and desire to secure by Letters Patent, is:

1. A universal joint comprising a pair of forked shaft members having journal bearings in the arms thereof, a journal member having individual cylindrical journal bearings registering with the journal bearings in the arms of the forked shaft members, a spherical journal member carried in each of the journal bearings of the journal member and engaging the journal bearings of the forked shaft members, and means securing said spherical journal members in place in the journal bearings in said journal member.

2. In a universal joint, the combination with a pair of forked shaft members having journal bearings in the arms thereof, of connecting means for said forked shaft members comprising a journal member having radial holes therethrough forming journal bearings, spherical journal members disposed in said journal bearings in said journal member, and means for forcing said spherical journal members into engagement with the journal bearings in the arms of the forked shaft members.

3. In a universal joint, the combination of a pair of forked shaft members having holes extending therethrough forming journal bearings in the arms thereof, a journal member having holes extending therethrough forming journal bearings for registration with the journal bearings in the arms of the forked shaft members, spherical journal members disposed in said journal bearings of said journal member for coaction with the journal bearings in the shaft members, a pair of opposed conical journal supporting members in supporting engagement with said journal members, and means for securing said journal supporting members in place.

4. In a universal joint, the combination of a pair of forked shaft members having journal bearings in the arms thereof, a journal bearing having radial bore-like journal bearings and an axial bore opening to the inner ends of the bearings, spherical journal members disposed in said journal bearings of said journal member to coact with said bearings of said shaft members, a pair of opposed conical journal supporting members disposed in said axial bore in said journal member in supporting engagement with said journal members, and means for securing said journal supporting members in place.

5. In a universal joint, the combination with forked shaft members having recesses therein, of connecting means for said forked shaft members comprising a journal member having individual cylindrical recesses registering with the recesses in the forked shaft members, a ball in each of the journal member recesses extending into the forked shaft member recesses, and ball adjusting means carried by the journal member.

6. In combination, in a universal joint, forked shaft members having holes therethrough, a journal member disposed between said forked shaft members for transmitting force from one to the other, said journal member having holes registering with but larger than the holes in the forked shaft members, a ball carried by each of the journal member holes, said balls extending into the registering forked shaft member holes, adjustment cones engaging the balls for forcing them into engagement with the forked shaft members, and a bolt extending through the cones for drawing said cones together into engagement with the balls.

In witness whereof I have hereunto set my hand.

CORLAN E. WOOD.